US012703804B2

(12) United States Patent
Osorio et al.

(10) Patent No.: US 12,703,804 B2
(45) Date of Patent: Aug. 11, 2026

(54) REMOVABLE PRINTING INKS FOR RECYCLABLE PLASTICS

(71) Applicant: SUN CHEMICAL CORPORATION, Parsippany, NJ (US)

(72) Inventors: Jarol Osorio, Charlotte, NC (US); Tabitha Yelverton, Charlotte, NC (US); Everett Garrish, Charlotte, NC (US)

(73) Assignee: Sun Chemical Corporation, Parsippany, NJ (US)

( * ) Notice: Subject to any disclaimer, the term of this patent is extended or adjusted under 35 U.S.C. 154(b) by 1144 days.

(21) Appl. No.: 17/769,009

(22) PCT Filed: Oct. 23, 2020

(86) PCT No.: PCT/US2020/056995
§ 371 (c)(1),
(2) Date: Apr. 14, 2022

(87) PCT Pub. No.: WO2021/081288
PCT Pub. Date: Apr. 29, 2021

(65) Prior Publication Data

US 2024/0101837 A1 Mar. 28, 2024

Related U.S. Application Data

(60) Provisional application No. 62/953,628, filed on Dec. 26, 2019, provisional application No. 62/925,804, filed on Oct. 25, 2019.

(51) Int. Cl.
*C09D 11/00* (2014.01)
*C09D 11/037* (2014.01)
(Continued)

(52) U.S. Cl.
CPC .......... *C09D 11/037* (2013.01); *C09D 11/102* (2013.01); *C09D 11/106* (2013.01)

(58) Field of Classification Search
CPC .... C09D 11/037; C09D 11/102; C09D 11/106
(Continued)

(56) References Cited

U.S. PATENT DOCUMENTS 6,147,041 A * 11/2000 Takahashi .............. C09D 5/008 523/160
2010/0239871 A1 * 9/2010 Scheffer .................. C09D 5/24 977/932

FOREIGN PATENT DOCUMENTS

CN 101288998 A 10/2008
CN 101874086 A 10/2010
(Continued)

OTHER PUBLICATIONS

International Search Report issued in International Application No. PCT/US2020/056995, mailed Feb. 12, 2021.
(Continued)

*Primary Examiner* — James E McDonough
(74) *Attorney, Agent, or Firm* — Marian E. Fundytus; Amster Rothstein & Ebenstein LLP

(57) ABSTRACT

Described herein are ink compositions that will not contaminate recycled plastic materials that come in contact with the inks; labels printed with such inks; and plastic articles having labels printed with such inks; and methods for printing with such inks, and recycled plastic material, such as recycled PET, that has little to no contamination from such inks. For example, during recycling, plastic containers that have been labelled with such inks are subjected to hot caustic wash solutions that cause the ink to separate the labels, When the inks described herein are removed from the label, they form a solid or precipitate, as opposed to dissolving in the hot caustic wash solution. The solid or precipitate is easily separated from the recycled plastic and wash solution, such as by filtration. The separated ink does
(Continued)

not contaminate or stain the recycled plastic, or does so to a degree that is tolerable.

10 Claims, 8 Drawing Sheets

(51) Int. Cl.
*C09D 11/102* (2014.01)
*C09D 11/106* (2014.01)

(58) Field of Classification Search
USPC .................................. 106/31.01, 31.13, 31.6
See application file for complete search history.

(56) References Cited

FOREIGN PATENT DOCUMENTS

| | | | |
|---|---|---|---|
| EP | 972651 | A1 * | 1/2000 |
| EP | 2 987 822 | | 2/2016 |
| JP | 2001 031899 | A | 2/2001 |
| WO | WO 2019/157482 | A1 | 8/2019 |
| WO | WO 2020/180652 | A1 | 9/2020 |
| WO | WO2020/214323 | A1 | 10/2020 |

OTHER PUBLICATIONS

Written Opinion of the International Searching Authority issued in International Application No. PCT/US2020/056995, mailed Feb. 12, 2021.
International Preliminary Report on Patentability (Chapter 1 of the Patent Cooperation Treaty) issued in International Application No. PCT/US2020/056995, mailed Mar. 9, 2022.
Office Action issued in VN Application No. 1-2022-03274 mailed Jul. 9, 2025, with English language translation thereof.
Taiwanese Office Action issued in counterpart Taiwanese Application No. 109136959, mailed May 8, 2024 with English language translation of key points.
Chinese Office Action issued in counterpart Chinese Application No. 202080072795.0, mailed Feb. 11, 2023 with English language translation of key points.
Chinese Office Action issued in counterpart Chinese Application No. 202080072795.0, mailed Jul. 7, 2023 with English language translation of key points.
Indian Office Action issued in counterpart India Application No. 202247023614, mailed Jul. 21, 2023.
Office Action issued in BR Application No. 112022007007-1 mailed Mar. 11, 2025, with English language translation thereof.
Indonesian Office Action issued in counterpart Indonesian Application No. P00202205504, mailed Jul. 1, 2024 with English language translation of key points.
Office Action issued in EP Application No. 20807601.8 mailed Nov. 24, 2025.

* cited by examiner

PRIOR ART

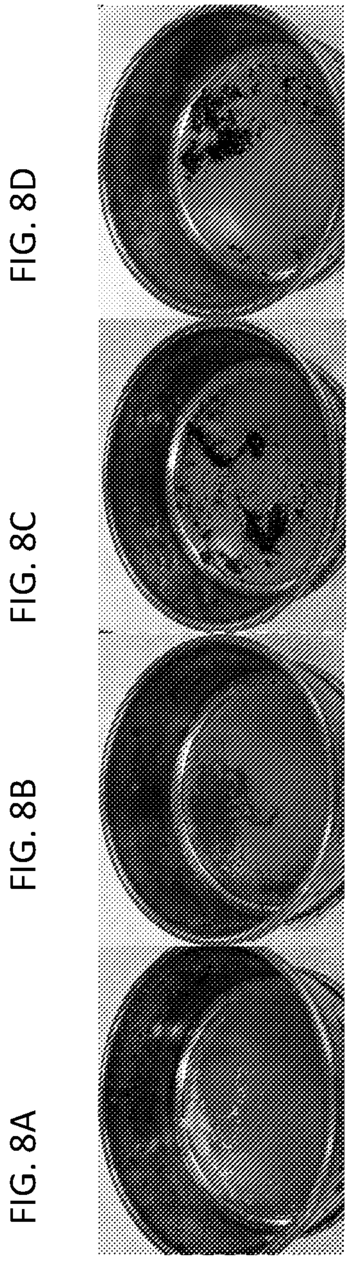
FIG. 8A
FIG. 8B
FIG. 8C
FIG. 8D
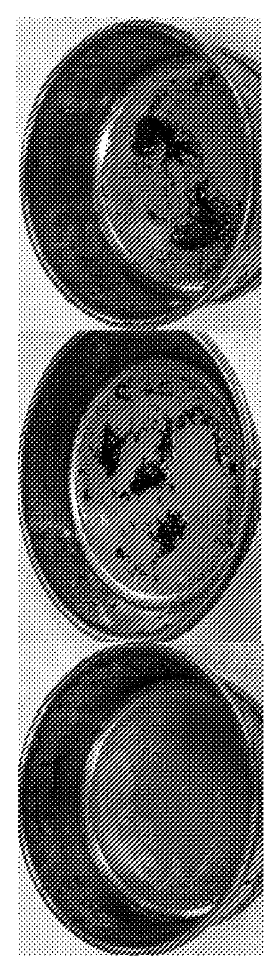
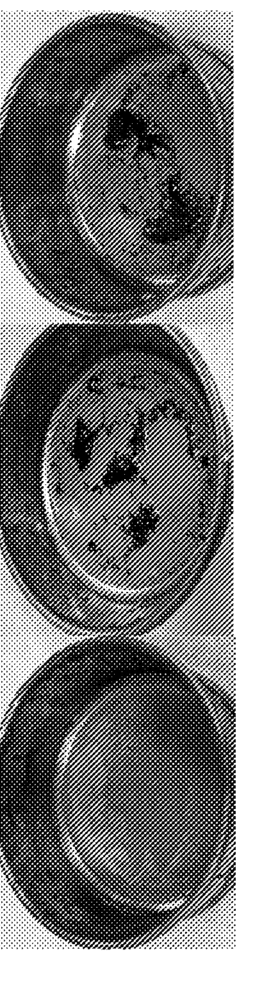
FIG. 8E
FIG. 8F
FIG. 8G

REMOVABLE PRINTING INKS FOR RECYCLABLE PLASTICS

CROSS REFERENCE TO RELATED APPLICATIONS

The present application is a § 371 National Phase application based on PCT/US2020/056995 filed Oct. 23, 2020, which claims the benefit of U.S. Provisional Application Nos. 62/925,804, filed Oct. 25, 2019 and 62/953,628, filed Dec. 26, 2019, the subject matter of each of which is incorporated by reference in their entirety.

BACKGROUND OF THE INVENTION

Polyethylene terephthalate (PET) is the material of choice for plastic bottles, containers and other packaging because it can be easily recycled. In the recycling process, the post-consumer PET material is ground into flake, which is again used to make PET products such as packaging.

Shrink sleeve labels are commonly used on food and beverage containers and consumer products, such as the above-mentioned PET containers. Shrink sleeve labels are easily applied to the container by heat shrinking the label to fit to the form and shape of the bottle, container, etc. in an efficient process. Shrink sleeve labels are popular on the supply side of commerce (i.e., consumer product producers, brand owners, packaging manufacturers, etc.). Such labels can be printed with a diverse range of colors and designs, and thus they appeal to consumers as well.

However, such labels also present challenges during recycling, and in particular to the recyclers of post-consumer PET bottles. In the recycling process, bottles and labels enter the recycle process together and are difficult to separate downstream. Further, the inks printed on the labels present a problem of their own. The inks printed on the labels typically will dissolve in the hot caustic solution used in recycling processes. The dissolved inks in the wash solution can contaminate the PET material by staining the flake. Staining of the flake downgrades its quality, thereby reducing the commercial value of the recycled PET flake. Further, wastewater contaminated with the inks require treatment which presents an additional expense and presents potential environmental issues.

Shrink sleeve labels are constructed of polyethylene terephthalate glycol (PET-G). This material can be problematic for recyclers because it tends to sink in the wash water step along with the PET flake material that is used to construct the bottles. The PET flake is then prone to clumping, making it very difficult to separate the two in the recycling process.

However, crystallizable PET-G resin, a relatively new polymer product, is now used as the label material. Crystallizable PET-G resin is fully recyclable with the PET flake from the bottles. Thus, relatively issue-free recycling is possible, as the crystallizable PET-G label material and the PET bottle materials can be ground up together to form flake.

Current state of the art inks printed on labels such as shrink sleeve labels solubilize in the hot caustic wash solutions, which typically are aqueous solutions of sodium hydroxide (NaOH), and non-ionic surfactants that have detergent properties. The inks, when they dissolve in such hot caustic wash solutions, stain the recycled PET flake and contaminate the caustic wash.

State of the art inks printed on substrates such as crystallizable PET-G film are completely removed or almost completely removed during the hot caustic (i.e., NaOH solution) wash cycle. However, the presence of these inks in the hot caustic wash solutions could recontaminate the commingled polyester materials. To maintain high quality recycled polyester product, the recycled material should have minimal to no staining and tinting.

Thus, an ink composition that is less likely to stain and contaminate the recycled PET product would be beneficial.

References that may be of interest include U.S. Pat. No. 6,147,041 and EP 2 987 822.

SUMMARY OF THE INVENTION

In one aspect, described herein are ink compositions that are resistant to dissolving in a hot caustic solution, the ink compositions comprising:

(a) a resin selected from the group consisting of: polyvinyl chloride-polyvinyl acetate copolymer, semi-aliphatic polyurethane, polymethyl methacrylate copolymer, isobutyl methacrylate copolymer, cellulose-based resins, styrene maleic anhydride copolymer, and combinations thereof;

(b) a solvent; and (c) a colorant resistant to dissolving in a hot caustic solution;

wherein the ink composition is resistant to dissolving in a hot caustic solution employed in a plastic material recycling process in which the plastic material being recycled comprises crystallizable PET-G substrate on which the ink composition had been printed and then removed in the hot caustic wash solution;

whereby the plastic material is not stained or contaminated by the ink composition.

In another aspect, the colorant present in the ink composition is selected from the group consisting of: Diarylide Yellow AAMX, Diarylide Yellow AAOA, Monoazo: 3-Hidroxy-2-naphthanilide, Copper Phthalocyanine, carbon black, Dianisidine Orange, Polychloro Copper Phthalocyanine, 3-Amino-9-Ethylcarbazole, and combinations thereof.

In one aspect, the colorant is a pigment in a dispersion.

In one aspect, the resin has a number average molecular weight of 5,000 to 125,000.

In one aspect, the resin has a weight average molecular weight of 10,000 to 130,000.

In one aspect, the resin comprises polyvinyl chloride-polyvinyl acetate copolymer having a number average molecular weight of 8,000 to 45,000.

In one aspect, the resin comprises polyvinyl chloride-polyvinyl acetate copolymer having a number average molecular weight of 12,000 to 38,000.

In one aspect, the resin comprises polyvinyl chloride-polyvinyl acetate copolymer having a number average molecular weight of 20,000 to 30,000.

In one aspect, the resin comprises polyvinyl chloride-polyvinyl acetate copolymer having a weight average molecular weight of 10,000 to 50,000.

In one aspect, the resin comprises polyvinyl chloride-polyvinyl acetate copolymer having a weight average molecular weight of 15,000 to 40,000.

In one aspect, the resin comprises polyvinyl chloride-polyvinyl acetate copolymer having a weight average molecular weight of having a weight average molecular weight of 20,000 to 30,000.

In one aspect, the resin comprises semi-aliphatic polyurethane having a number average molecular weight of 27,000 to 85,000.

In one aspect, the resin comprises semi-aliphatic polyurethane having a number average molecular weight of 37,000 to 75,000.

In one aspect, the resin comprises semi-aliphatic polyurethane having a number average molecular weight of 47,000 to 65,000.

In one aspect, the resin comprises semi-aliphatic polyurethane having a weight average molecular weight of 30,000 to 90,000.

In one aspect, the resin comprises semi-aliphatic polyurethane having a weight average molecular weight of 40,000 to 80,000.

In one aspect, the resin comprises semi-aliphatic polyurethane having a weight average molecular weight of 50,000 to 70,000.

In one aspect, the resin comprises polymethyl methacrylate copolymer having a number average molecular weight of 38,000 to 125,000.

In one aspect, the resin comprises polymethyl methacrylate copolymer having a number average molecular weight of 48,000 to 105,000.

In one aspect, the resin comprises polymethyl methacrylate copolymer having a number average molecular weight of 53,000 to 85,000.

In one aspect, the resin comprises polymethyl methacrylate copolymer having a weight average molecular weight of 40,000 to 130,000.

In one aspect, the resin comprises polymethyl methacrylate copolymer having a weight average molecular weight of 50,000 to 110,000.

In one aspect, the resin comprises polymethyl methacrylate copolymer having a weight average molecular weight of 55,000 to 90,000.

In one aspect, the resin comprises isobutyl methacrylate copolymer having a number average molecular weight of 28,000 to 80,000.

In one aspect, the resin comprises isobutyl methacrylate copolymer having a number average molecular weight of 38,000 to 70,000.

In one aspect, the resin comprises isobutyl methacrylate copolymer having a number average molecular weight of 42,000 to 60,000.

In one aspect, the resin comprises isobutyl methacrylate copolymer having a weight average molecular weight of 30,000 to 85,000.

In one aspect, the resin comprises isobutyl methacrylate copolymer having a weight average molecular weight of 40,000 to 75,000.

In one aspect, the resin comprises isobutyl methacrylate copolymer having a weight average molecular weight of 45,000 to 65,000.

In one aspect, the resin comprises styrene maleic anhydride copolymer having a number average molecular weight of 800 to 18,000.

In one aspect, the resin comprises styrene maleic anhydride copolymer having a number average molecular weight of 2200 to 12,200

In one aspect, the resin comprises styrene maleic anhydride copolymer having a number average molecular weight of 3800 to 8500.

In one aspect, the resin comprises styrene maleic anhydride copolymer having a weight average molecular weight of 1000 to 20,000.

In one aspect, the resin comprises styrene maleic anhydride copolymer having a weight average molecular weight of 2500 to 12,500

In one aspect, the resin comprises styrene maleic anhydride copolymer having a weight average molecular weight of 4000 to 9000.

In one aspect, combinations of one or more resins described herein may be present in the ink compositions.

In one aspect, the ink composition further comprises further comprising alcohol ethoxylate phosphate ester, which is a surfactant.

In one aspect, the amount of resin present in the ink composition is 3.0 wt % to 25 wt %, preferably 5.0 wt % to 20 wt %, and more preferably 7.0 wt % to 16 wt %.

In one aspect, the amount of colorant present in the ink composition is 2.0 wt % to 25 wt %, preferably 3.0 wt % to 20 wt %, and more preferably 4.0 wt % to 18 wt %.

In one aspect, the amount of colorant present in the ink composition is 2.0 wt % to 20 wt %, preferably 5.0 wt % to 15 wt %, and more preferably 8.0 wt % to 12 wt %.

In one aspect, the amount of solvent present in the ink composition is 60 wt % to 80 wt %, preferably 65 wt % to 75 wt %, and more preferably 68 wt % to 72 wt %.

In one aspect, the amount of solvent present in the ink composition is 50 wt % to 99 wt %, preferably 50 wt % to 90 wt %, and more preferably 60 wt % to 90 wt %.

In one aspect, the ink composition further comprises a wax.

In one aspect, the wax is selected from the group consisting of amide wax, erucamide wax, polypropylene wax, paraffin wax, polyethylene wax, polytetrafluoroethylene, carnuba wax, and combinations thereof.

In one aspect, the ink composition further comprises an additive selected from adhesion promoters, silicones, light stabilizers, de-gassing additives, ammonia, flow promoters, defoamers, antioxidants, stabilizers, surfactants, dispersants, plasticizers, rheological additives, and combinations thereof.

In one aspect, the ink composition further comprises an extender selected from clay, talc, calcium carbonate, magnesium carbonate, silica and combinations thereof.

In one aspect, the ink composition further comprises a titanium chelate as an adhesion promoter.

In one aspect, the ink compositions and the components contained therein comply with one or more regulatory standards governing migration of substances in the ink composition.

Also described herein is a printed article comprising a substrate on which the present ink compositions is applied.

In one aspect, the substrate is constructed of a material selected from polyethylene terephthalate glycol, crystallized polyethylene terephthalate glycol, polyethylene, polypropylene and polyvinyl chloride.

In one aspect, the substrate is a label.

In one aspect, the substrate is a shrink sleeve label.

Also described herein is packaging material comprised of the printed article described herein and a container. The container material may be constructed of high density polyethylene (HDPE), PET, PET-G, styrene, among others.

In one aspect, the container of the packaging material is constructed of a material selected from polyethylene terephthalate.

Also described herein is recycled polyethylene terephthalate derived from one or both of the printed article described herein and the packaging material described herein.

In one aspect, the recycled polyethylene terephthalate, when placed in a hot caustic solution for 15 minutes, exhibits a difference in L*, a* and b* values, when compared to the L*, a* and b* values of a polyethylene terephthalate material that has been placed in a hot caustic solution that does not contain ink, of: ΔL: <±5.0, Δa: <±1.5, and Δb: <±1.5, when measured on an X-rite spectrophotometer.

In one aspect, the recycled polyethylene terephthalate, when placed in a hot caustic solution for 15 minutes, exhibits a difference in L*, a* and b* values, when compared to the L*, a* and b* values of a polyethylene terephthalate material that has been placed in a hot caustic solution that does not contain ink, of: ΔL: <+5.0, Δa: <+1.5, and Δb: <+1.5, when measured on an X-rite spectrophotometer.

Also described herein is a method of providing plastic recycled material comprising the steps of:

- recycling a used plastic material to provide a recycled plastic material, the recycling comprising the step of immersing the used plastic material in a hot caustic solution, the used plastic material comprising crystallizable PET-G substrate on which the ink composition described herein has been printed;
- whereby the ink composition is removed from the crystallizable PET-G substrate in the hot caustic wash solution and is resistant to dissolving in the hot caustic wash solution;
- whereby the recycled plastic material is not stained or contaminated by the ink composition.

In one aspect of the method, the ink composition removed from the crystallizable PET-G substrate comprises a precipitate, and the method further includes the step of filtering out the precipitate from the solution.

In one aspect of the method, the used plastic material further comprises PET.

In one aspect of the method, the crystallizable PET-G substrate is a label.

In one aspect of the method, the used plastic material derives from a container or bottle.

Obtaining L*, a*, and b* values as indicated above demonstrates that the ink components do not contaminate or stain the recycled material that comes in contact with the inks when in the hot caustic solution.

It is to be understood that wherein a numerical range is recited, it includes the end points, all values within that range, and all narrower ranges within that range, whether specifically recited or not.

BRIEF DESCRIPTION OF THE DRAWINGS

FIG. 8A depicts insoluble particles derived from the ink composition of Example 15 (yellow) and insoluble $TiO_2$ particles that derive from a backing white ink. The Example 15 ink composition and the backing white ink were printed on a label and removed in a hot caustic wash solution. The particles were captured in a filter;

FIG. 8B depicts insoluble particles derived from the ink composition of Example 16 (magenta) and insoluble $TiO_2$ particles that derive from a backing white ink. The Example 16 ink composition and the backing white ink were printed on a label and removed in a hot caustic wash solution. The particles were captured in a filter;

FIG. 8C depicts insoluble particles derived from the ink composition of Example 17 (cyan) and insoluble $TiO_2$ particles that derive from a backing white ink. The Example 17 ink composition and the backing white ink were printed on a label and removed in a hot caustic wash solution. The particles were captured in a filter;

FIG. 8D depicts insoluble particles derived from the ink composition of Example 18 (black) and insoluble $TiO_2$ particles that derive from a backing white ink. The Example 18 ink composition and the backing white ink were printed on a label and removed in a hot caustic wash solution. The particles were captured in a filter;

FIG. 8E depicts insoluble particles derived from the ink composition of Example 19 (orange) and insoluble $TiO_2$ particles that derive from a backing white ink. The Example 19 ink composition and the backing white ink were printed on a label and removed in a hot caustic wash solution. The particles were captured in a filter;

FIG. 8F depicts insoluble particles derived from the ink composition of Example 20 (green) and insoluble $TiO_2$ particles that derive from a backing white ink. The Example 20 ink composition and the backing white ink were printed on a label and removed in a hot caustic wash solution. The particles were captured in a filter;

FIG. 8G depicts insoluble particles derived from the ink composition of Example 21 (violet) and insoluble $TiO_2$ particles that derive from a backing white ink. The Example 21 ink composition and the backing white ink were printed on a label and removed in a hot caustic wash solution. The particles were captured in a filter.

DETAILED DESCRIPTION OF THE INVENTION

Figures 1A, 1B, 2A, 2B, 3A, 3B:
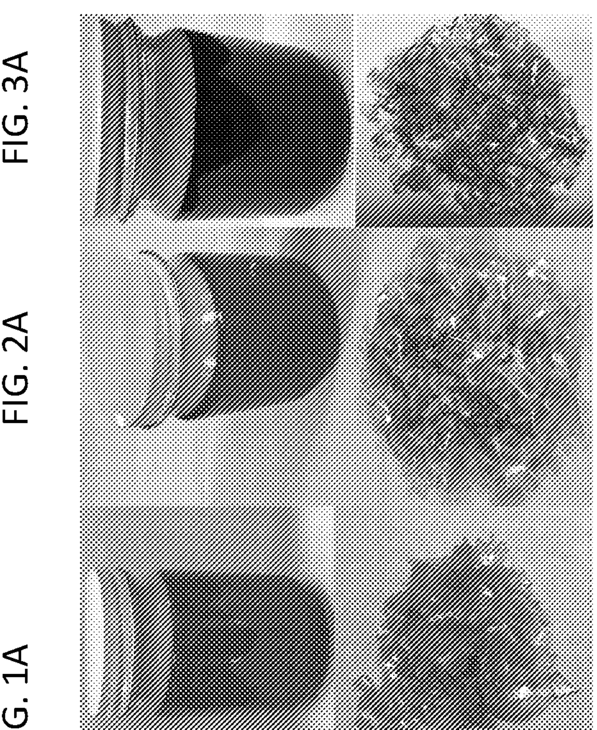
FIGS. 1A and 1B respectively depict caustic wash solution contaminated with a state of the art ink removed from a label and contaminated PET flake that had dwelled in the contaminated wash solution.
FIGS. 2A and 2B respectively depict caustic wash solution contaminated with another state of the art ink removed from a label and contaminated PET flake that had dwelled in the contaminated wash solution.
FIGS. 3A and 3B respectively depict caustic wash solution contaminated with yet another state of the art ink removed from a label and yet another contaminated PET flake that had dwelled in the contaminated wash solution.

The present invention is directed to: ink compositions that will not contaminate recycled plastic materials that come in contact with the inks; labels printed with such inks; and plastic articles having labels printed with such inks; and methods for printing with such inks, and recycled plastic material, such as recycled PET, that has little to no contamination from such inks. For example, during recycling, plastic containers that have been labeled with such inks are subjected to hot caustic wash solutions that cause the ink to separate the labels, when the inks described herein are removed from the label, they form a solid or precipitate, as opposed to dissolving in the hot caustic wash solution. The solid or precipitate is easily separated from the recycled plastic and wash solution, such as by filtration. The separated ink does not contaminate or stain the recycled plastic, or does so to a degree that is tolerable.

The absence of contamination that results from printing labels with the inks described herein allows for simultaneous recycling of the plastic bottle and label, without staining or otherwise compromising properties of the resultant recycled polymer flake. The recyclable plastic container could be any used for this purpose, including HDPE, PET, PET-G, styrene, etc.

In one aspect, the label material on which the inks are printed is constructed of crystallizable PET-G.

In another preferred embodiment, the inks comprise a polyvinyl chloride/polyvinyl acetate (PVC/PVA) copolymer.

In another preferred embodiment, the inks used for printing the PET-G label comprise a high acid value (e.g., in the range of 40 mg KOH/g to 150 mg KOH/g) polymethyl methacrylate (PMMA) copolymer resin, an isobutyl methacrylate (IBMA) copolymer resin, and combinations thereof. Molecular weights for these resins are provided elsewhere in this disclosure.

In one aspect, the described ink compositions, and the components thereof (e.g., the resin, the solvent, the colorants, additives, waxes, extenders, etc.), comply with one or more regulatory schemes promulgated by various governments, trade organizations, and private companies that concern the kinds and amounts of substances that may be present in inks, coatings, or which migrate into foods, pharmaceuticals, consumer products, and the like. Those regulatory schemes include the following discussed below.

The safety of food contact materials in Europe is governed by the Framework Regulation (EC) No 1935/2004. Article 5 of this regulation includes a provision for regulating concerning specific food contact materials. One such regulation for specific food contact materials is Plastics Regulation (EU) No 10/20011. The Plastics Regulation contains a positive list of substances with Specific Migration Limits. Link to regulation: https://eur-lex.europa.eu/legal-content/EN/TXT/?qid=1592209990405&uri=CELEX:32011R0010.

Energy-curable compositions applied to the non-contact surface of primary or secondary packaging intended for foodstuffs are governed by Article 3 of Regulation (EC) No 1935/20041.

The Swiss Federal Department of Home Affairs (FDHA) adopted an amendment to the Ordinance of 23 Nov. 2005 on Materials and Articles provisions relating to packaging inks (SR 817.023.21). The requirement is that only permitted substances should be used in the manufacture of Packaging Inks. Permitted Substances are defined as those which are listed in Annex 2, Lists I and II, and in Annex 10. The substances listed in Annex 2 reference those listed in the above mentioned Plastics Regulation (EU) No 10/20011. The substances listed in Annex 10 are split into list A and list B. Substances listed with List A status either have a quoted specific migration limit (SML) or default to a global migration limit of 60 mg/Kg (60 ppm). Substances listed with List B status have a default migration limit of 0.01 mg/Kg (10 ppb). Link to Swiss Ordinance Annex 10: https://www.blv.admin.ch/dam/blv/en/dokumente/lebensmittel-und-ernaehrung/rechts-und-vollzugsgrundlagen/lebensmittelrecht2017/anhang10-verordnung-materialien-kontakt-lm-gg.pdf.download.pdf/Annex-10-ordinance-fdha-materials-and-articles-intended-to-come-into-contact-with-food-stuffs.pdf. These are collectively referred to as the "Swiss Ordinances".

The United States has adopted the Federal Food Drug and Cosmetic Act, embodied in Title 21 of the United States Code. Regulations promulgated in furtherance of this Act are embodied in certain parts of 21 CFR, which is the Code of Federal Regulations governing food and drugs. Title 21 is administered by the Food and Drug Administration, the Drug Enforcement Administration, and the Office of National Drug Control Policy. In FDA 21 CFR § 175.300 (b)(1)-(3), it is indicated that coatings may be formulated from:

- Substances that are generally recognized as safe in food;
- Substances the use of which are permitted by regulation or prior sanctions and employed under the specific conditions of the prior sanction or approval;
- Substances that are the subject of another regulation and conform with any specifications in the other regulation; and
- Substances specifically listed in 21 CFR § 175.300(b)(3).
- Link to FDA 21 CFR § 175.300: https://www.govinfo.gov/app/details/CFR-2011-title21-vol3/CFR-2011-title21-vol3-sec175-300.
- 21 CFR § 178.3297 regulates colorants for polymers.

China adopted a new overall Food Safety Law On Jun. 1, 2009. This replaced the 1995 Food Hygiene Law and requires approval of all "food-related products", which includes food packaging materials and equipment used in production of food. This food safety law includes a horizontal standard regulation GB9685-2016 which contains positive lists for additives in food contact materials. The food safety law also includes material standard regulations titled GB 4806.x where x denotes a number associated with a specific food contact material. Link to the China standard: https://www.chinesestandard.net/PDF.aspx/GB9685-2016

The ink compositions and substances contained there may also comply with one or more of the regulations promulgated by other regulatory schemes include those of the European Printing Ink Trade Association ("EuPIA"), the European Food Safety Authority (EFSA), the REACH regulation(s) promulgated by the European Commission (such as EC 1907/2006), Nestle, Japan, Canada, Australia, and New Zealand.

Other pertinent regulatory and guideline information includes "Regulatory positive lists", which are lists set forth in one or more of EU Plastics Regulation, EFSA Opinion, Provisional List of Additives used in Plastics, and Swiss Ordinance in Table 11. Key sections include:

- Plastics Regulation (EU) No 10/20011. The Plastics Regulation contains a positive list of substances with Specific Migration Limits. Link to regulation: https://eur-lex.europa.eu/legal-content/EN/TXT/?qid=1592209990405&uri=CELEX:32011R0010 (previously mentioned on page 2);
- Link to EFSA website: http://www.efsa.europa.eu/
- Link to Provisional list of additives used in plastics: https://ec.europa.eu/food/sites/food/files/safety/docs/cs_fcm_legis_additives-prov-list.pdf
- Link to Swiss Ordinance Annex 10: https://www.blv.admin.ch/dam/blv/en/dokumente/lebensmittel-und-ernaehrung/rechts-und-vollzugsgrundlagen/lebensmittelrecht2017/anhang10-verordnung-materialien-kontakt-lm-gg.pdf.download.pdf/Annex-10-ordinance-fdha-materials-and-articles-intended-to-come-into-contact-with-food-stuffs.pdf (previously mentioned on page 3).

"EFSA based substance hazard assessment process" is based on the Threshold of Toxicological Concern approach to hazard assessment from the European Food Safety Authority (EFSA) as developed in the following documents:

1. EFSA Document: Outcome of the public consultation on the draft guidance on the use of the Threshold of Toxicological Concern approach in food safety assessment. APPROVED: 17 May 2019, doi:10.2903/sp.efsa.2019.EN-1661
2. EFSA Document: Guidance on the use of the Threshold of Toxicological Concern approach in food safety assessment, ADOPTED: 24 Apr. 2019, doi: 10.2903/j.efsa.2019.5708
3. EFSA Document: Priority topics for the development of risk assessment guidance by EFSA's Scientific Committee in 2016-2018, ADOPTED: 19 May 2016, doi: 10.2903/j.efsa.2016.4502
4. EFSA and WHO document: Review of the Threshold of Toxicological Concern (TTC) approach and development of new TTC decision tree. PUBLISHED: 10 Mar. 2016
5. EFSA Document: Scientific Opinion on Exploring options for providing advice about possible human health risks based on the concept of Threshold of Toxicological Concern (TTC). EFSA Journal 2012; 10(7):2750; and
6. European Printing Ink Trade Association (EuPIA) document: EuPIA Guidance for Risk Assessment of Non-Intentionally Added Substances (NIAS) and Non-Evaluated or Non-Listed Substances (NLS) in printing inks for food contact materials", available at: https://www.eupia.org/fileadmin/Documents/Risk Assessment/2020-03-12-EuPIA_NIAS_Guidance.pdf. In particular, see the schematic on page 15.

Coatings of the invention will de-seam when placed in hot caustic environments, such as those used during the whole container washing step that is part of the recycling process. The washing step is generally done in a "hot caustic bath", a/k/a "hot caustic solution" at 80° C. to 95° C.

The terms "hot caustic bath" and "hot caustic solution" are defined as an aqueous solution containing 1.0% to 3.0% by weight NaOH at a temperature of 80° C. to 95° C. The terms are used interchangeably herein. Further, the hot caustic bath or solution may contain surfactant, such as non-ionic surfactant, in an amount of 0.1 wt % to 1.0 wt %. In the testing of the described ink compositions reported in this paper, the "hot caustic bath" or "hot caustic solution" is an aqueous solution containing 1.5% by weight NaOH at a temperature of 85° C., and which further contains 0.3% by weight non-ionic surfactant.

The inks of the present invention minimize the risk of staining the recycled PET flake and contamination of wash waters since they are preferably fully removable from the printed surfaces to which they have been applied when those printed articles come in contact with hot caustic solution and non-ionic surfactant. The inventive ink compositions do not solubilize in the hot caustic solution, instead breaking down into small particles that precipitate, allowing for removal by filtration in a rinse step.

The present invention consists of solvent-based ink compositions with the following materials:

Resins

The ink compositions described herein include one or more resins. Suitable resins include polyvinyl chloride (PVC)/polyvinyl acetate (PVA) co-polymer; semi-aliphatic polyurethane; polymethyl methacrylate (PMMA) copolymer; IBMA (isobutyl methacrylate) copolymer; cellulose based resins; styrene maleic anhydride copolymer; and combinations thereof. Due to the differences in pigment chemistry, some ink formulations will include specific resins in order that they not dissolve in the caustic solution. This will be explained in further detail below.

Some of the inks described herein require additional raw materials such as IBMA copolymer and alcohol ethoxylate phosphate ester to help achieve the proper balance for ink removal with minimal discoloration, particularly when Phthalocyanine Blue and Green pigments are present in the ink. Still other inventive examples use different levels and ratios of methacrylic copolymer (i.e., PMMA copolymer) and PVC/PVA copolymer necessary to achieve the purpose.

In one aspect, the resin comprises polyvinyl chloride-polyvinyl acetate copolymer having a weight average molecular weight of 10,000 to 50,000, preferably having a weight average molecular weight of 15,000 to 40,000, more preferably having a weight average molecular weight of 20,000 to 30,000.

In one aspect, the resin comprises semi-aliphatic polyurethane having a weight average molecular weight of 30,000 to 90,000, preferably having a weight average molecular weight of 40,000 to 80,000, more preferably having a weight average molecular weight of 50,000 to 70,000.

In one aspect, the resin comprises polymethyl methacrylate copolymer having a weight average molecular weight of 40,000 to 130,000, preferably having a weight average molecular weight of 50,000 to 110,000, more preferably having a weight average molecular weight of 55,000 to 90,000.

In one aspect, the resin comprises isobutyl methacrylate copolymer having a weight average molecular weight of 30,000 to 85,000, preferably having a weight average molecular weight of 40,000 to 75,000, more preferably having a weight average molecular weight of 45,000 to 65,000.

In one aspect, the resin comprises styrene maleic anhydride copolymer having a weight average molecular weight of 1000 to 20,000, preferably having a weight average molecular weight of 2500 to 12,500, more preferably having a weight average molecular weight of 4000 to 9000.

In another aspect, combinations of one or more resins described herein may be present in the ink compositions.

Molecular weights can be determined by gel permeation chromatography (GPC). See, e.g. Cambridge Polymer Group—Molecular Weight Determination, www.campoly-.com/cpg-services/analytical-testing/molecular-weight-determination.

Relevant standards used for determining molecular weight are:

- ASTM D6474: Standard Test Method for Determining Molecular Weight Distribution and Molecular Weight Averages of Polyolefins by High Temperature Gel Permeation Chromatography;
- ASTM D5296: Standard Test Method for Molecular Weight Averages and Molecular Weight Distribution of Polystyrene by High Performance Size-Exclusion Chromatography; and
- ISO 13885-1: Binders for Paints and Varnishes—Gel Permeation Chromatography (GPC)—Part 1: Tetrahydrofuran (THF) as Eluent.

Also see: https://www.doitpoms.ac.uk/tlplib/polymerbasics/mw.php#:~:text=The%20number%20average%20molecular%20weight%20is%20defined%20as%20the%20total,the%20total%20number%20of%20molecules.&text=where%20xi%20is%20the,with%20molecular %20weight%20Mi.

The contents of these documents and website are incorporated by reference herein in their entirety.

Suitable resin products that may be used with this application include:

- Elvacite® 2669, a polymethyl methacrylate copolymer, molecular weight is 60,000, Tg is 70° C., acid number is 124mgKOH/g, available from Lucite International, Cordova TN;
- Neocryl® B-731, an IBMA copolymer, molecular weight is 56,000, Tg is 56° C., acid number is 1 mgKOH/g, available from Koninklijke DSM N.V.;
- The Lunavin series of polyvinyl chloride/polyvinyl acetate copolymers, such as Lunavin VYHH, Lunavin VYHD, Lunavin VYNS-3, Lunavin YMCA, Lunavin VMCH, Lunavin VROH, Lunavin VAGC, Lunavin VAGF, Lunavin VAGD, and Lunavin VAGH, available from DKSH North America, Budd Lake, N.J.
- NeoRez® U-395, a semi-aliphatic polyurethane, available from Koninklijke DSM N.V. Other suitable polyurethane resin products include NeoRez® U-392, NeoRez®U-329 and NeoRez®U-371.
- Dianal PB-588, high acid value resin, molecular weight is 90,000, Tg is 50° C., available from Dianal America, Pasadena TX; and
- SMA® 17352, styrene maleic anhydride copolymer, molecular weight is 7000, Tg is 125° C., acid number is 270 mgKOH/g, available from Cray Valley, Exton PA.

Solvents

The ink compositions include one or more solvents, for example, solvents selected from aliphatic hydrocarbons, cyclic hydrocarbons, aromatic hydrocarbons, ketones, aldehydes, alcohols, ethers, and esters, and combinations thereof. Regarding particular solvents, the solvent may be selected from for example, ethanol, propanol, isopropanol, glycerol, propylene glycol, alkylene glycol ethers ether acetates, 4-hydroxy-4-methyl-2-pentanone, N-propyl acetate, ethyl acetate, isopropyl acetate, diethylene glycol butyl ether, diethylene glycol ethyl ether, diethylene glycol methyl ether, diethylene glycol monoethyl ether acetate, diethylene glycol monopropyl ether, dipropylene glycol ethyl ether, dipropylene glycol methyl ether, ethylene glycol butyl ether, ethylene glycol ethyl ether, ethylene glycol isopropyl ether, ethylene glycol methyl ether, ethylene glycol propyl ether, glycerine carbonate, N-methyl 2-pyrollidone, propylene glycol, propylene glycol ethyl ether, propylene glycol ethyl ether acetate, propylene glycol methyl ether, propylene glycol n-propyl ether, triethylene glycol butyl ether, triethylene glycol methyl ether, tripropylene glycol tripropylene glycol methyl ether and mixtures thereof.

Aromatic solvents such as toluene or strong solvents such as methyl ethyl ketone ("MEK") can be used but they may also be avoided, therefore widening the operating window for application on films sensitive to those solvents. It also broadens the window for printing processes other than gravure, such as flexo and digital (inkjet).

Additives

Additives may be incorporated in the ink compositions to enhance one or more properties. A partial list of such additives includes but is not limited to adhesion promoters (e.g. titanium chelate adhesion promoter), silicones, light stabilizers, de-gassing additives, ammonia, flow promoters, defoamers, antioxidants, stabilizers, surfactants, dispersants, plasticizers, rheological additives, waxes, silicones, among others. Combinations of these additives may be used.

The ink compositions may also include waxes such as but not limited to amide wax, erucamide wax, polypropylene wax, paraffin wax, polyethylene wax, polytetrafluoroethylene wax (i.e., Teflon®), carnuba wax and the like. A combination of waxes may be employed. It is preferred that the wax be a mixture of amide and erucamide waxes. The wax may be present an amount of 0.1 wt % to 4.0 wt %, preferably 0.1 wt % to 2.0 wt %.

Colorants

The colorants present in the inks of the present invention should be resistant to dissolving in hot caustic solution. In one aspect, the colorant is a pigment. In another aspect it is in a dispersion. Applicant has found that the following pigments are resistant to dissolving in hot caustic solution: partial list of such pigments includes the following in Table 1:

| Chemical Name | Description | Color Index |
|---|---|---|
| Diarylide Yellow AAMX | 2752180: SUNBRITE ® YELLOW 13 | 13 |
| Diarylide Yellow AAOA | 2750023:02: SUNBRITE ® YELLOW 17 | 17 |
| Monoazo: 3-Hidroxy-2-naphthanilide | PERMANENT RUBINE F6B | 184 |
| Copper Phthalocyanine | BLUE 15:4 4831H | 15:4 |
| Carbon Black | REGAL 400R | 7 |
| Dianisidine Orange | IRGALITE ORANGE L 2970 | 16 |
| Polychloro Copper Phthalocyanine | 2643066:02: SPECTRAPAC ® C GREEN 7:C044 | 7 |
| 3-Amino-9-Ethylcarbazole | 2461670: INDOFAST ® VIOLET 23:C044 | 23 |

In one aspect, the pigments meet approval under the Federal Food, Drug & Cosmetic Act, found in Title 21 of the U.S. Code.

Extenders

The inks described herein may contain the usual extenders such as clay, talc, calcium carbonate, magnesium carbonate, silica, and combinations thereof.

The inks described herein are suitable for use on crystallizable PET-G substrate films, which may be used to form shrink sleeve labels, such as shrink sleeve labels that cover the full container. Suitable PET-G substrate materials for labels include Ecolabel Skyrol SP-620 from SKC Films and Bonpet BR-1 from Bonset America Corporation.

Examples

The invention is further described by the following examples which further illustrate the invention. The examples do not limit the scope of the invention.

Inks were prepared by mixing the ingredients listed in Tables 2, 3 and 4-7.

TABLE 2

Inventive Examples 1-7 (All amounts are % by weight)

| Material | Ex. 1 | Ex. 2 | Ex. 3 | Ex. 4 | Ex. 5 | Ex. 6 | Ex. 7 |
|---|---|---|---|---|---|---|---|
| NORMAL PROPYL ACETATE | 31.0 | 55.5 | 17.9 | 42.9 | 42.6 | 17.9 | 54.5 |
| ETHYL ALCOHOL | 7.2 | 8.7 | 6.7 | 9.7 | 13.4 | 6.7 | 3.3 |
| ETHYL ACETATE | 5.9 | 2.6 | 6.7 | 5.5 | 4.8 | 6.7 | 3.3 |
| ISOPROPYL ACETATE | 29.8 | 19.3 | 32.3 | 13.1 | 17.5 | 31.0 | 10.1 |
| METHOXY PROPRANOL ACETATE | 5.4 | | 6.9 | 5.9 | 4.1 | 6.9 | 9.6 |
| IBMA COPOLYMER | 5.3 | | 6.8 | | | 6.8 | |
| METHACRYLIC COPOLYMER (high acid value PMMA copolymer) | 1.0 | 2.8 | 0.4 | 6.0 | 5.2 | 0.4 | 3.5 |
| POLYVINYL CHLORIDE/VINYL ACETATE | 3.7 | 4.7 | 4.1 | 5.1 | 4.4 | 4.1 | 4.6 |
| EPOXIDIZED SOYBEAN OIL | 1.6 | | | | | | |
| POLYESTER SEBACATE | | 1.8 | 2.1 | 1.8 | 1.8 | 2.1 | 2.1 |

TABLE 2-continued

| Inventive Examples 1-7 (All amounts are % by weight) | | | | | | | |
|---|---|---|---|---|---|---|---|
| Material | Ex. 1 | Ex. 2 | Ex. 3 | Ex. 4 | Ex. 5 | Ex. 6 | Ex. 7 |
| ALCOHOL ETHOXYLATE PHOSPHATE ESTER | | | 2.3 | | | 2.3 | |
| MONOAZO RED 184 PIGMENT | 9.1 | | | | | | |
| PIGMENT YELLOW 17 | | 4.6 | | | | | |
| COPPER PHTHALOCY ANINE BLUE 15:4 | | | 13.8 | | | | |
| CARBON BLACK PIGMENT 7 | | | | 10.0 | | | |
| DIANISIDINE ORANGE PIGMENT 16 | | | | | 6.2 | | |
| POLYCHLORO COPPER PHTHALO GREEN 7 | | | | | | 15.1 | |
| 3-AMINO-9-ETHYLCARBAZOLE VIOLET 23 | | | | | | | 9.0 |
| Total | 100 | 100 | 100 | 100 | 100 | 100 | 100 |

TABLE 3

| Inventive Examples 8-14 (All amounts are % by weight) | | | | | | | |
|---|---|---|---|---|---|---|---|
| Material | Ex. 8 | Ex. 9 | Ex. 10 | Ex. 11 | Ex. 12 | Ex. 13 | Ex. 14 |
| NORMAL PROPYL ACETATE | 30.5 | 51.8 | 17.9 | 39.7 | 17.9 | 55.8 | 40.4 |
| ETHYL ALCOHOL | 7.5 | 3.9 | 6.7 | 12.3 | 6.7 | 8.7 | 8.7 |
| ETHYL ACETATE | 5.9 | 3.9 | 6.7 | 5.3 | 6.7 | 2.6 | 6.2 |
| ISOPROPYL ACETATE | 30.0 | 12.1 | 31.0 | 19.3 | 32.3 | 19.3 | 14.6 |
| METHOXY PROPRANOL ACETATE | 5.4 | 5.4 | 6.9 | 4.0 | 6.9 | | 4.5 |
| IBMA COPOLYMER | 5.3 | | 6.8 | | 6.8 | | |
| PMMA COPOLYMER | 1.0 | 4.2 | 0.4 | 5.7 | 0.4 | 2.8 | 6.7 |
| POLYVINYL CHLORIDE/VINYL ACETATE | 3.7 | 5.4 | 4.1 | 4.9 | 4.1 | 4.7 | 5.7 |
| EPOXIDIZED SOYBEAN OIL | 1.6 | | | | | | |
| POLYESTER SEBACATE | | 2.5 | 2.1 | 2.0 | 2.1 | 1.5 | 2.0 |
| ALCOHOL ETHOXYLATE PHOSPHATE ESTER | | | 2.3 | | 2.3 | | |
| MONOAZO RED 184 PIGMENT | 9.1 | | | | | | |
| PIGMENT YELLOW 17 | | | | | | 4.6 | |
| COPPER PHTHALOCY ANINE BLUE 15:4 | | | | | 13.8 | | |
| CARBON BLACK PIGMENT 7 | | | | | | | 11.2 |
| DIANISIDINE ORANGE PIGMENT 16 | | | | 6.8 | | | |
| POLYCHLORO COPPER PHTHALO GREEN 7 | | | 15.1 | | | | |
| 3-AMINO-9-ETHYLCARBAZOLE VIOLET 23 | | 10.8 | | | | | |
| Total | 100 | 100 | 100 | 100 | 100 | 100 | 100 |

Note:
Examples 8-14 represent inks that are compliant with Nestle's regulatory requirements.

Examples 3, 6, 10 and 12, which respectively include green and blue pigments, include alcohol ethoxylate phosphate ester and isobutyl methacrylate (IBMA) copolymer. It has been found that the inclusion of IBMA copolymer and alcohol ethoxylate phosphate ester in green and blue inks, such as those including Polychloro Copper Phthalo Green 7 and Copper Phthalocyanine Blue 15:4 exhibit good ink removal while experiencing minimal discoloration. Other ink compositions of the examples include different amounts and ratios of methacrylic (i.e., PMMA) copolymer and PVC/PVA copolymer which help maintain this balance when other pigments are used.

Inventive Examples 15-22 include semi-aliphatic polyurethane polymer. The formulations for these examples are shown below. All amounts are weight percent:

TABLE 4

| Inventive Example 15 | | Inventive Example 16 | |
|---|---|---|---|
| CRCGS2718005: DPC-1650 Gravure Yellow | % | CRCGS4718004: DPC-1650 Gravure Magenta | % |
| Ethanol | 50.6 | Ethanol | 46.4 |
| N-propyl acetate | 22.4 | N-propyl acetate | 25.5 |

TABLE 4-continued

| Inventive Example 15 | | Inventive Example 16 | |
|---|---|---|---|
| CRCGS2718005: DPC-1650 Gravure Yellow | % | CRCGS4718004: DPC-1650 Gravure Magenta | % |
| C. I. Pigment Yellow 13 | 6.2 | C.I. Pigment Red 184 | 10.5 |
| Polyurethane Polymer | 8.1 | Polyurethane Polymer | 8.4 |
| Ethyl acetate | 2.6 | Ethyl acetate | 2.6 |
| Maleic modified rosin ester | 2.2 | Cellulose nitrate | 2.1 |
| Cellulose nitrate | 2.0 | Polytetrafluoroethylene | 1.5 |
| Polytetrafluoroethylene | 1.5 | Isopropyl Alcohol | 1.2 |
| Isopropyl Alcohol | 1.2 | Silica, Amorphous | 0.8 |
| Polypropylene Glycol | 1.2 | Siloxane | 0.5 |
| Silica, Amorphous | 0.8 | N-propanol | 0.3 |
| Siloxane | 0.5 | 2-propenoic acid, polymer with ethene | 0.2 |
| N-propanol | 0.2 | | |
| 2-propenoic acid, polymer with ethene | 0.2 | | |
| Polyethylene Glycol | 0.3 | | |
| Total | 100.0 | Total | 100.0 |

TABLE 5

| Inventive Example 17 CRCGS5718006: DPC-1650 Gravure Cyan | % | Inventive Example 18 CRCGS9718007: DPC-1650 Gravure Black | % |
|---|---|---|---|
| Ethanol | 39.5 | Ethanol | 38.5 |
| N-propyl acetate | 17.2 | N-propyl acetate | 8.0 |
| C.I. Pigment Blue 15:4 | 14.2 | C. I. Pigment Black 7 | 14.4 |
| Polyurethane Polymer | 11.5 | Polyurethane Polymer | 11.5 |
| Ethyl acetate | 3.4 | Ethyl acetate | 3.1 |
| Polymerized Rosin | 0.2 | 2-methoxy-1-methylethyl acetate | 9.3 |
| Cellulose nitrate | 2.9 | Cellulose nitrate | 2.9 |
| Polytetrafluoroethylene | 1.5 | Polytetrafluoroethylene | 1.5 |
| Isopropyl Alcohol | 1.7 | Isopropyl Alcohol | 2.9 |
| 1-Propoxy-2-Propanol | 6.2 | 1-Propoxy-2-Propanol | 6.2 |
| Silica, Amorphous | 0.8 | Silica, Amorphous | 0.8 |
| Siloxane | 0.5 | Siloxane | 0.5 |
| N-propanol | 0.2 | N-propanol | 0.2 |
| 2-propenoic acid, polymer with ethene | 0.2 | 2-propenoic acid, polymer with ethene | 0.2 |
| Total | 100 | Total | 100 |

TABLE 6

| Inventive Example 19 CRCGS3718009: DPC-1650 Trans Gravure Orange | % | Inventive Example 20 CRCGS3718008: DPC-1650 Opaque Gravure Orange | % |
|---|---|---|---|
| Ethanol | 49.3 | Ethanol | 48.4 |
| N-propyl acetate | 22.6 | N-propyl acetate | 23.2 |
| C. I. Pigment Orange 16 | 13.0 | C. I. Pigment Orange 16 | 12.0 |
| Polyurethane Polymer | 6.9 | Polyurethane Polymer | 7.7 |
| Ethyl acetate | 2.3 | Ethyl acetate | 2.5 |
| Cellulose nitrate | 1.7 | Cellulose nitrate | 1.9 |
| Polytetrafluoroethylene | 1.5 | Polytetrafluoroethylene | 1.5 |
| Isopropyl Alcohol | 1.0 | Isopropyl Alcohol | 1.1 |
| Silica, Amorphous | 0.8 | Silica, Amorphous | 0.8 |
| Siloxane | 0.5 | Siloxane | 0.5 |
| N-propanol | 0.2 | N-propanol | 0.2 |
| 2-propenoic acid, polymer with ethene | 0.2 | 2-propenoic acid, polymer with ethene | 0.2 |
| Total | 100 | Total | 100 |

TABLE 7

| Inventive Example 21 CRCGS7718010: DPC-1650 Gravure Green | % | Inventive Example 22 CRCGS6718011: DPC-1650 Gravure Violet | % |
|---|---|---|---|
| Ethanol | 46.2 | Ethanol | 43.7 |
| N-propyl acetate | 20.8 | N-propyl acetate | 20.3 |
| Phthalo Green C.I. 7 Pigment | 15.6 | C.I. Pigment Violet 23 | 10.8 |
| Polyurethane Polymer | 8.3 | Polyurethane Polymer | 8.6 |
| Ethyl acetate | 2.6 | Ethyl acetate | 2.7 |
| Polymerized Rosin | 0.0 | Polymerized Rosin | 0.0 |
| Cellulose nitrate | 2.1 | Cellulose nitrate | 2.2 |
| Polytetrafluoroethylene | 1.5 | Polytetrafluoroethylene | 1.5 |
| Isopropyl Alcohol | 1.2 | Isopropyl Alcohol | 1.3 |
| 1-Propoxy-2-Propanol | 0.0 | 1-Propoxy-2-Propanol | 7.2 |
| Silica, Amorphous | 0.8 | Silica, Amorphous | 0.8 |
| Siloxane | 0.5 | Siloxane | 0.5 |
| N-propanol | 0.2 | N-propanol | 0.2 |
| 2-propenoic acid, polymer with ethene | 0.2 | 2-propenoic acid, polymer with ethene | 0.2 |
| Total | 100 | Total | 100 |

The simulation of recycling post-consumer PET bottles having printed labels on shrinkable film such as Crystallizable PET was conducted as follows:

Three (3) of printed labels (PET-G) are cut into 0.25-inch×0.25-inch pieces and blended with 100 g of clean PET flake.

A beaker containing a 1.5 wt % aqueous caustic solution (200 mL water to which 3 g NaOH and 0.6 g of Triton X-100 surfactant have been added) heated on a hot plate to 85° C. At this temperature, the label pieces and PET flake are added to the beaker. The beaker contents are stirred for 15 minutes at 1000 rpm with a benchtop mixer.

After 15 minutes, the beaker is removed from the heat source and the caustic wash solution and flakes are strained through a filter (sieve or organdy cloth). The solution is collected in a glass jar.

The flakes are rinsed with water until the rinse water is clear or only minimal discoloration is observed. The flakes are allowed to dry.

The CIELAB color space (also known as CIE L*a*b* or sometimes abbreviated as simply "Lab" color space) is a color space defined by the International Commission on Illumination (CIE) in 1976. It expresses color as three values: L* for the lightness from black (0) to white (100), a* from green (−) to red (+), and b* from blue (−) to yellow (+).

After drying, L*, a*, and b* color value coordinates of the rinsed and dried PET flakes are determined using an X-rite spectrophotometer. The reported values are the averages of the readings taken on 10 flakes. Flatter flakes are preferred (i.e., better spectrophotometer readability).

A control is prepared in the same manner, except without including printed label pieces. In other words, no ink is present in the control. The L*, a*, and b* values for the control PET flakes are those of the flake themselves without contribution from the ink.

Target values for color change of the PET flakes vs. the control as established by the APR (Association of Plastics Recyclers) are as follows ΔL*:<±5.0, Δa*: «1.5, and Δb*: <±1.5.

However, for some applications, a wider range of values may be acceptable, for example:

ΔL*: <±7.5, and in some cases <±10.0; Δa*: <±2.0, and in some cases <±2.5; and Δb*: <±2.0, and in some cases <±2.5.

The ΔL*, Δa*, Δb* values for color change for the inks of Examples 1-7 vs. control are shown below in Table 8:

| Ink Example | Δ Values vs. control ΔL* | Δa* | Δb* |
|---|---|---|---|
| Target: | +/−5 | +/−1.5 | +/−1.5 |
| R4106-20-E9C: Cyan (Example 3) | 0.24 | 0.03 | 0.06 |
| CRCGS4197837: DPC-1628 Magenta (Example 1) | 2.17 | −0.37 | −0.01 |
| CRCGS2197838: DPC-1628 Yellow (Example 2) | 0.47 | −0.04 | 0.00 |
| CRCGS9197839: DPC-1628 Black (Example 4) | 1.83 | −0.13 | 0.03 |
| R4106-20-E2HD: Violet (Example 7) | 0.41 | −0.05 | −0.21 |
| R4106-20-E9A9: Green (Example 6) | −0.31 | 0.36 | −0.02 |
| R4106-20-E9B1: Orange (Example 5) | 0.42 | −0.25 | −0.18 |

Table 8 shows the minimal discoloration of the flakes produced with the method of the present invention. All of the ΔL*, Δa*, Δb* values are well below the target threshold.

The ΔL*, Δa*, Δb* values for color change for the inks of Examples 15-22 vs. control are shown below in Table 9:

TABLE 9

| ΔL*, Δa*, Δb* values for color change vs. control | | | |
|---|---|---|---|
| Ink Example | ΔL * | Δa* | Δb* |
| Magenta (Example 16) | −0.68 | 0.71 | −0.79 |
| Opaque Orange (Example 20) | −0.22 | 0.38 | 0.32 |
| Transparent Orange (Example 19) | −0.91 | 0.40 | 0.93 |
| Yellow (Example 15) | −0.24 | −0.29 | 0.84 |
| Green (Example 21) | 0.16 | −0.54 | −0.30 |
| Cyan (Example 17) | 0.27 | −0.58 | −0.76 |
| Violet (Example 22) | −0.33 | 0.38 | −0.66 |
| Black (Example 18) | −0.42 | −0.03 | −0.07 |

Table 9 shows the minimal discoloration of the flakes produced with the method of the present invention. All of the ΔL*, Δa*, Δb* values are well below the target threshold.

FIGS. 1A, 1B, 2A, 2B, 3A, and 3B show current state of the art for soluble ink technology for three different comparative inks, which stain the recycled PET flake and cause severe contamination/discoloration of the caustic wash water. The 3 inks used are FIGS. 1A, 1B: Sunate C; FIGS. 2A, 2B: Harmony Plus; FIGS. 3A, 3B: Styropake. Each of these inks is available from Sun Chemical Corp.

Figures 4A, 4B, 4C, 4D, 4E:
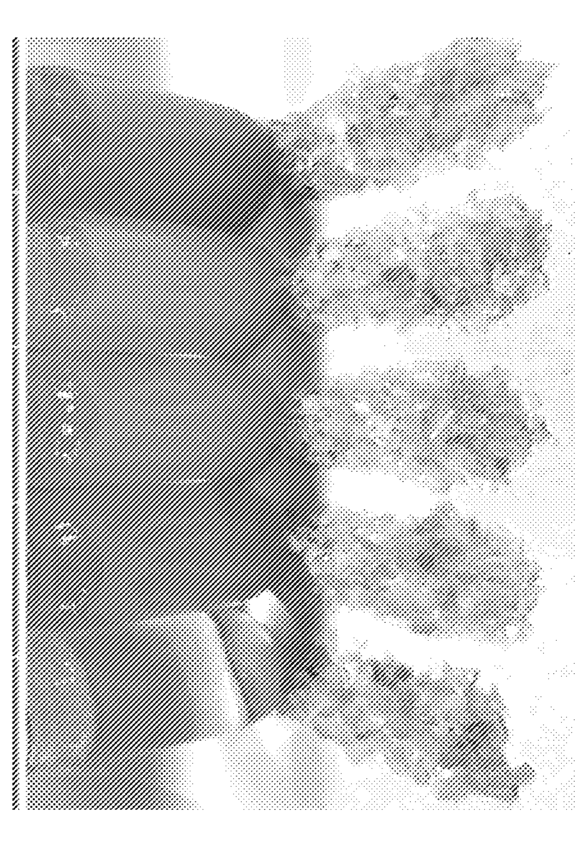
FIG. 4A depicts a control wash solution that did not contain label or ink and PET flake that dwelled within the wash solution.
FIG. 4B depicts a wash solution that contained label printed with the ink composition of Example 3 (cyan) and PET flake that dwelled within the wash solution.
FIG. 4C depicts a wash solution that contained label printed with the ink composition of Example 1 (magenta) and PET flake that dwelled within the wash solution.
FIG. 4D depicts a wash solution that contained label printed with the ink composition of Example 2 (yellow) and PET flake that dwelled within the wash solution.
FIG. 4E depicts a wash solution that contained label printed with the ink composition of Example 4 (black) and PET flake that dwelled within the wash solution.
Figures 4A, 4F, 4G, 4H:
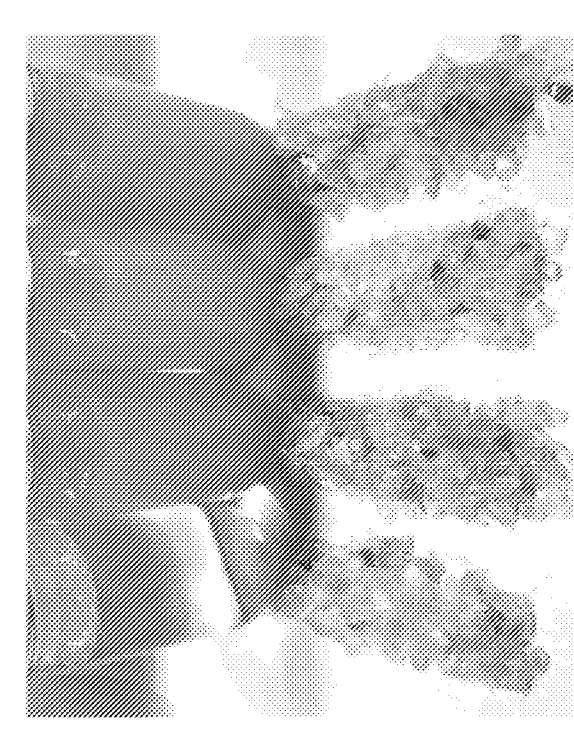
FIG. 4F depicts a wash solution that contained label printed with the ink composition of Example 7 (violet) and PET flake that dwelled within the wash solution.
FIG. 4G depicts a wash solution that contained label printed with the ink composition of Example 5 (orange) and PET flake that dwelled within the wash solution.
FIG. 4H depicts a wash solution that contained label printed with the ink composition of Example 6 (green) and PET flake that dwelled within the wash solution.
Figures 5A, 5B, 5C, 5D, 5E, 5F, 5G:
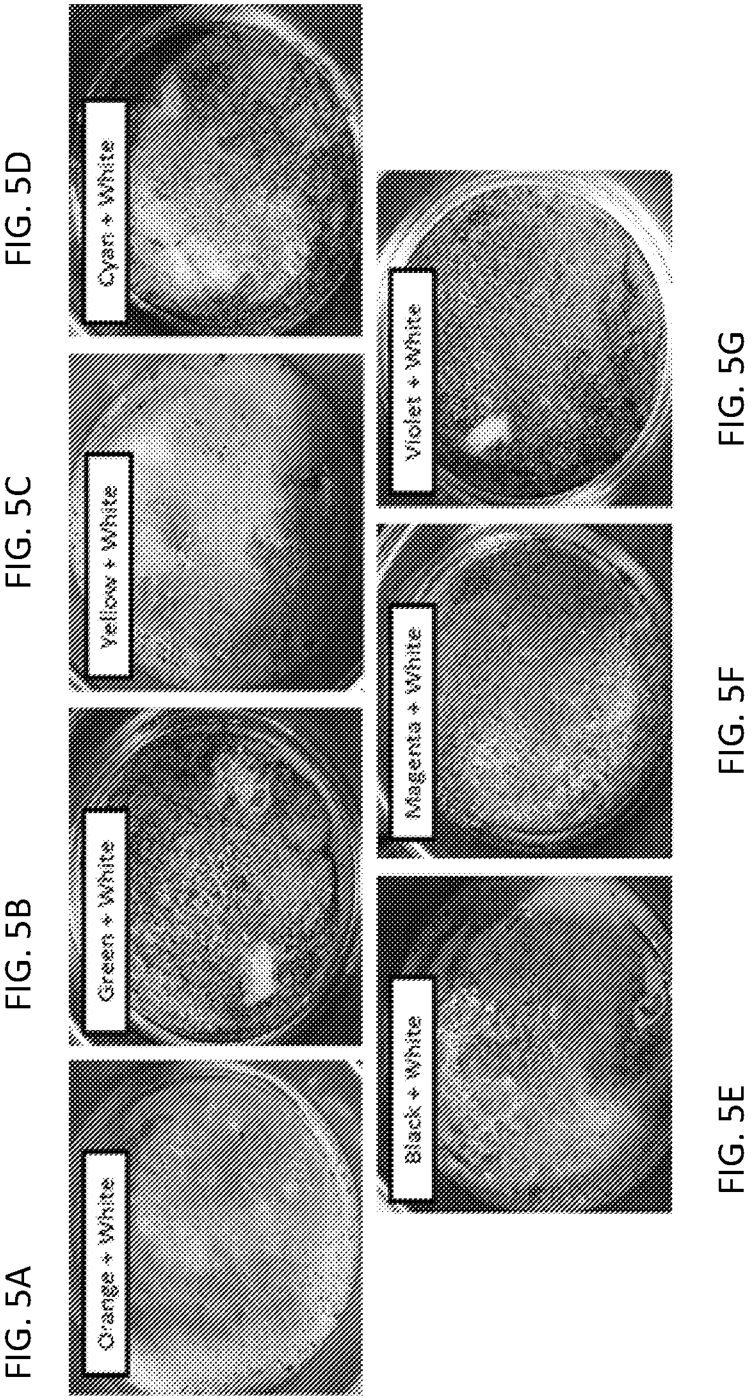
FIG. 5A depicts insoluble particles derived from the ink composition of Example 5 (orange) and insoluble $TiO_2$ particles that derive from a backing white ink. The Example 5 ink composition and the backing white ink were printed on a label and removed in a hot caustic wash solution. The particles were captured in a filter.
FIG. 5B depicts insoluble particles derived from the ink composition of Example 6 (green) and insoluble $TiO_2$ particles that derive from a backing white ink. The Example 6 ink composition and the backing white ink were printed on a label and removed in a hot caustic wash solution. The particles were captured in a filter.
FIG. 5C depicts insoluble particles derived from the ink composition of Example 2 (yellow) and insoluble $TiO_2$ particles that derive from a backing white ink. The Example 2 ink composition and the backing white ink were printed on a label and removed in a hot caustic wash solution. The particles were captured in a filter.
FIG. 5D depicts insoluble particles derived from the ink composition of Example 3 (cyan) and insoluble $TiO_2$ particles that derive from a backing white ink. The Example 3 ink composition and the backing white ink were printed on a label and removed in a hot caustic wash solution. The particles were captured in a filter.
FIG. 5E depicts insoluble particles derived from the ink composition of Example 4 (black) and insoluble $TiO_2$ particles that derive from a backing white ink. The Example 4 ink composition and the backing white ink were printed on a label and removed in a hot caustic wash solution. The particles were captured in a filter.
FIG. 5F depicts insoluble particles derived from the ink composition of Example 1 (magenta) and insoluble $TiO_2$ particles that derive from a backing white ink. The Example 1 ink composition and the backing white ink were printed on a label and removed in a hot caustic wash solution. The particles were captured in a filter.
FIG. 5G depicts insoluble particles derived from the ink composition of Example 7 (violet) and insoluble $TiO_2$ particles that derive from a backing white ink. The Example 7 ink composition and the backing white ink were printed on a label and removed in a hot caustic wash solution. The particles were captured in a filter.

FIG. 4A depicts a control wash solution that did not contain label or ink and PET flake that dwelled within the wash solution.

FIGS. 4B-4H depict a wash solution that contained label printed with ink compositions of Examples 1-7 and PET flake that dwelled within the wash solution. In comparison to the wash solutions shown in FIGS. 1A, 2A, and 3A, the wash solutions shown in FIGS. 4B-4H are much cleaner and less contaminated with ink. Further, in comparison to the PET flake shown in FIGS. 1B, 2B, and 3B, the PET flake shown in FIGS. 4B-4H is cleaner and less stained by the inks that were present in the wash solution. The less soluble ink compositions described herein which allow for the production of cleaner PET flake with minimal contamination of the caustic wash solution. The inks shown in FIGS. 4B to 4H are:

R4106-20-E9C Cyan=Inventive Examples 3 and 12;

CRCGS4197837 DPC-1628 Magenta=Inventive Examples 1 and 8;

CRCGS2197838 DPC-1628 Yellow=Inventive Examples 2 and 13;

CRCGS9197839 DPC-1628 Black=Inventive Examples 4 and 14;

R4106-20-E2HD Violet=Inventive Examples 7 and 9;

R4106-20-E9B1 Orange=Inventive Examples 5 and 11;

R4106-20-E9A9 Green=Inventive Examples 6 and 10.

FIGS. 5A to 5G depict a precipitate including insoluble particles derived from the ink composition of Examples 1-7 and insoluble $TiO_2$ particles that derive from a backing white ink. The backing white ink and then the ink composition was printed on the label material. The inks compositions and backing white ink were then removed in a hot caustic wash solution. The particles were captured in a filter.

The backing white ink is Contour White CRQGS1092281 from Sun Chemical, which contains $TiO_2$. $TiO_2$ is known to be insoluble in caustic wash and will readily precipitates. Thus, many different backing white inks will serve the purposed of avoiding contamination of the wash solution.

Figures 6A, 6B, 6C, 6D:
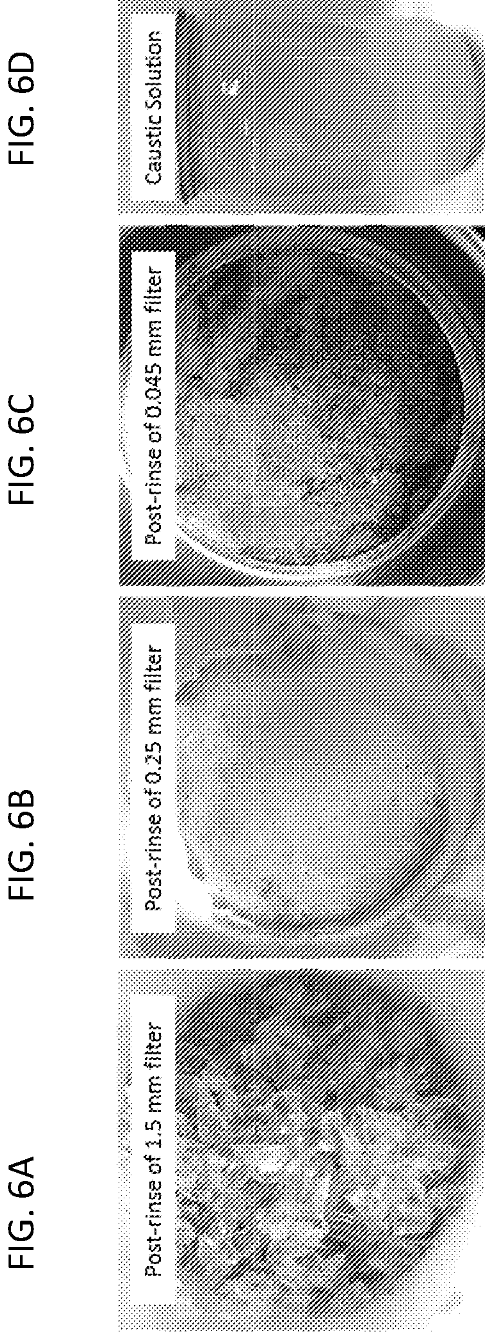
FIG. 6A depicts material retained by a 1.5 mm pore size filter after dwelling in a hot caustic wash solution that contained an ink of one of the above examples and a white backing ink, the material primarily being PET flake.
FIG. 6B depicts material retained by a 0.25 mm pore size filter after dwelling in a hot caustic wash solution that contained an ink of one of the above examples and a white backing ink, the material primarily being white insoluble $TiO_2$ particles.
FIG. 6C depicts material retained by a 0.045 mm pore size filter after dwelling in a hot caustic wash solution that contained an ink of one of the above examples and a white backing ink, the material primarily being insoluble ink particles.
FIG. 6D depicts the hot caustic wash solution after passing through the filters described in FIGS. 6A, 6B, and 6C.
Figures 7A, 7B, 7C, 7D:
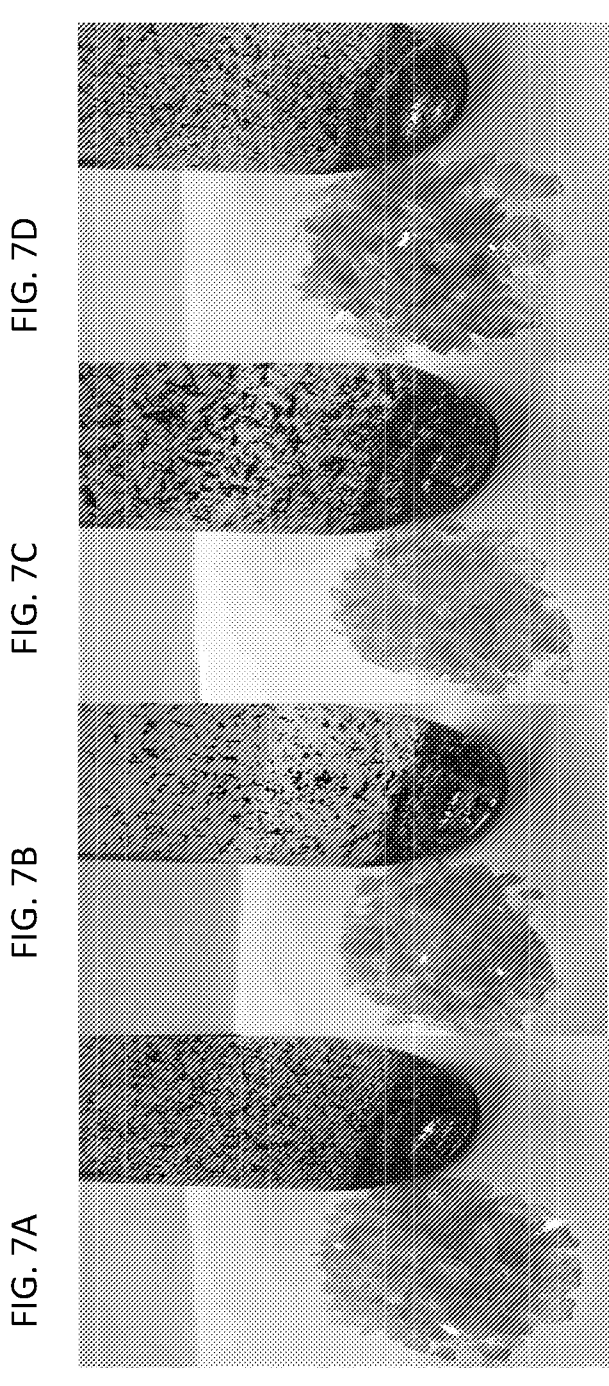
FIG. 7A depicts a wash solution that contained label printed with the ink composition of Example 17 (cyan) and PET flake that dwelled within the wash solution.
FIG. 7B depicts a wash solution that contained label printed with the ink composition of Example 18 (black) and PET flake that dwelled within the wash solution.
FIG. 7C depicts a wash solution that contained label printed with the ink composition of Example 20 (green) and PET flake that dwelled within the wash solution.
FIG. 7D depicts a wash solution that contained label printed with the ink composition of Example 21 (violet) and PET flake that dwelled within the wash solution.
Figures 7E, 7F, 7G:
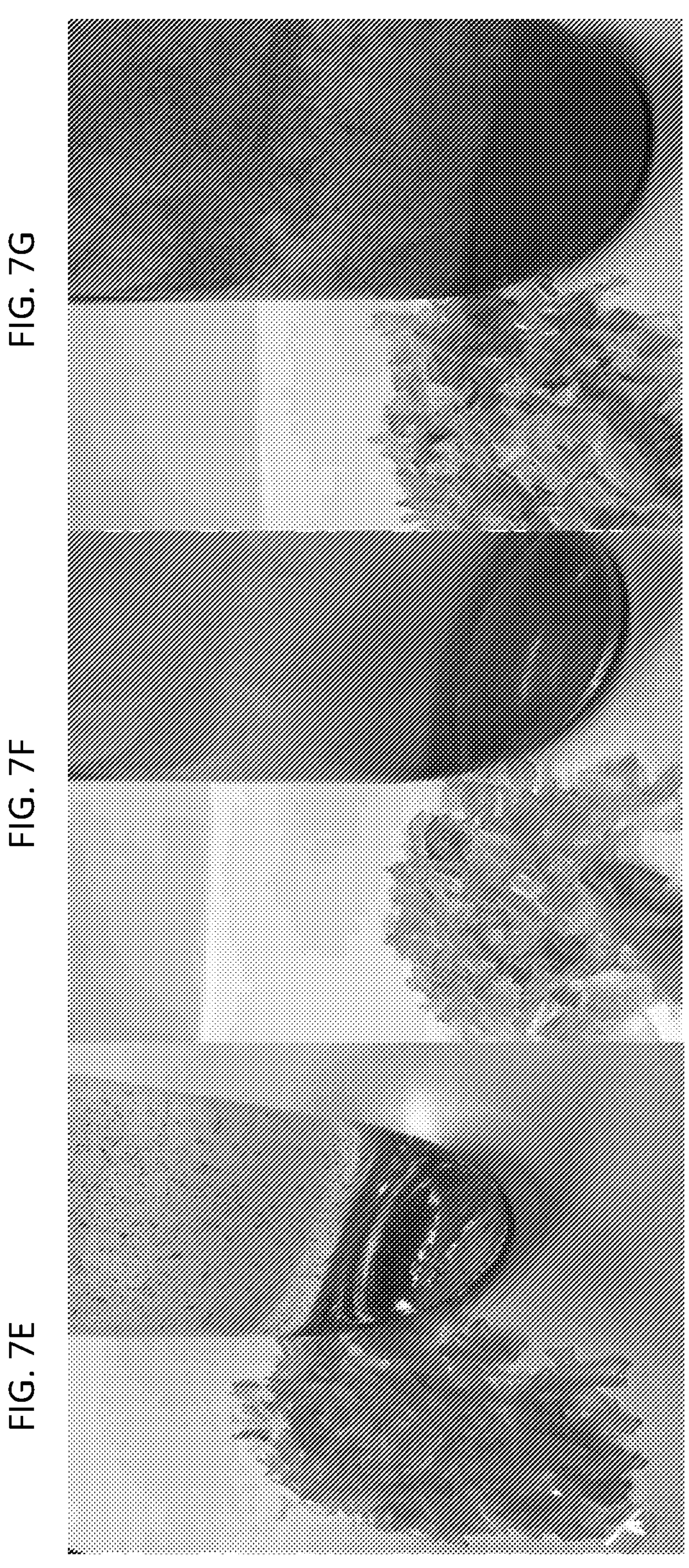
FIG. 7E depicts a wash solution that contained label printed with the ink composition of Example 15 (yellow) and PET flake that dwelled within the wash solution.
FIG. 7F depicts a wash solution that contained label printed with the ink composition of Example 16 (magenta) and PET flake that dwelled within the wash solution.
FIG. 7G depicts a wash solution that contained label printed with the ink composition of Example 19 (orange) and PET flake that dwelled within the wash solution.

FIGS. 6A, 6B and 6C depict material respectively retained by 1.5 mm, 0.25mmm and 0.045 mm filters after dwelling in a hot caustic wash solution that contained an ink of one of the above examples and a white backing ink. The material of FIG. 6A is primarily PET flake. The material of FIG. 6B is primarily white insoluble $TiO_2$ particles. The material of FIG. 6C is primarily insoluble ink particles of the inks described herein.

FIG. 6D depicts the hot caustic wash solution after passing through the filters described in FIGS. 6A, 6B, and 6C.

FIGS. 6A-6D show that it is advantageous filter the solution stepwise, first with a coarser filter, for example 1.5 mm for removing the PET flake, and then second and third finer filters for capturing white backing ink particles and precipitated ink particles. The PET flake removed by the coarser 1.5 mm filter may be washed further with water (post rinse) to further remove any precipitated pigment particles that may cling to the flake in order to provide flake that is substantially free of pigment. While the filters used in the present case have been shown to be effective, filters of other sizes may also be used. The recycled PET flake of FIG. 6A and the final caustic wash solution of FIG. 6D are clean and exhibiting minimal staining (i.e., discoloration) and contamination.

FIGS. 7A-7G show wash solutions that contained label printed with the ink compositions of Examples 15-22 and PET flake that dwelled within the wash solutions. These figures show that the ink compositions described herein effect little to no discoloration of the PET. This is believed to be due to the significantly reduced solubility of the ink compositions in the hot caustic solution. This allows for the production of cleaner in higher quality recycled PET flake. The inks shown in the these examples are:

CRCGS2718005 DPC-1650 Yellow=Inventive Example 15;

CRCGS4718004 DPC-1650 Magenta=Inventive Example 16;

CRCGS5718006 DPC-1650 Cyan=Inventive Example 17;

CRCGS9718007 DPC-1650 Black=Inventive Example 18;

CRCGS3718009 DPC-1650 Orange=Inventive Example 19;

CRCGS7718010 DPC-1650 Green=Inventive Example 21;

CRCGS6718011 DPC-1650 Violet=Inventive Example 22.

FIGS. 8A-8G show a precipitate that includes insoluble particles derived from the ink compositions of Examples 15-22 and insoluble $TiO_2$ particles that derive from a backing white ink (Contour White CRQGS1092281 from Sun Chemical, which contains $TiO_2$). The ink compositions of Examples 15-22 and the backing white ink were printed on a label and immersed in a beaker of hot caustic solution as described herein, and the particles were captured by a filter. As with the previous FIGS. 6A-6D, these figures demonstrate that filtration not requiring any special equipment is an effective way to separate the insoluble ink particles from the PET flake and caustic solution.

All documents mentioned in this disclosure are incorporated by reference in their entirety and for all purposes.

The present invention has been described in detail, including the preferred embodiments thereof. However, it will be appreciated that those skilled in the art, upon consideration of the present disclosure, may make modifications and/or improvements on this invention that fall within the scope and spirit of the invention.

We claim:

1. An ink composition comprising:

(a) a mixture comprising:

i) polyvinyl chloride-polyvinyl acetate copolymer resin, and a resin selected from the group consisting of polymethyl methacrylate or isobutyl methacrylate copolymer; or ii) semi-aliphatic polyurethane resin and polytetrafluoroethylene;

(b) 50 wt % to 90 wt % solvent selected from aliphatic hydrocarbons, cyclic hydrocarbons, aromatic hydrocarbons, ketones, aldehydes, alcohols, ethers, esters, and combinations thereof; and (c) a colorant resistant to dissolving in a hot caustic solution;

wherein the amount of resin present in the ink composition is 3.0 wt % to 25 wt %;

wherein the ink composition is resistant to dissolving in a hot caustic solution employed in a plastic material recycling process in which the plastic material being recycled comprises crystallizable PET-G substrate on which the ink composition had been printed and then removed in the hot caustic wash solution, wherein the ink composition breaks down into small particles that precipitate, allowing for removal from the hot caustic wash solution by filtration in a rinse step;

wherein the hot caustic solution is an aqueous solution containing 1.5% by weight NaOH at a temperature of 85° C., and which further contains 0.3% by weight non-ionic surfactant;

whereby the plastic material is not stained or contaminated by the ink composition.

2. The ink composition of claim 1, wherein the colorant is selected from the group consisting of: Diarylide Yellow AAMX, Diarylide Yellow AAOA, Monoazo: 3-Hydroxy-2-naphthanilide, Copper Phthalocyanine, carbon black, Dianisidine Orange, Polychloro Copper Phthalocyanine, 3-Amino-9-Ethylcarbazole, and combinations thereof.

3. The ink composition of claim 1, further comprising alcohol ethoxylate phosphate ester.

4. The ink composition of claim 1, wherein the amount of colorant present in the ink composition is 2.0 wt % to 20 wt %.

5. The ink composition of claim 1, wherein the amount of solvent present in the ink composition is 60 wt % to 80 wt %.

6. The ink composition of claim 1, further comprising a wax.

7. The ink composition of claim 1, further comprising a wax selected from the group consisting of amide wax, erucamide wax, polypropylene wax, paraffin wax, polyethylene wax, polytetrafluoroethylene, carnuba wax, and combinations thereof.

8. The ink composition of claim 1, further comprising an additive selected from adhesion promoters, silicones, light stabilizers, de-gassing additives, ammonia, flow promoters, defoamers, antioxidants, stabilizers, surfactants, dispersants, plasticizers, rheological additives, and combinations thereof.

9. The ink composition of claim 1, further comprising an extender selected from clay, talc, calcium carbonate, magnesium carbonate, silica and combinations thereof.

10. The ink composition of claim 1, further comprising a titanium chelate as an adhesion promoter.

* * * * *